United States Patent
Yang et al.

(10) Patent No.: US 11,387,515 B2
(45) Date of Patent: Jul. 12, 2022

(54) BATTERY ASSEMBLY, SYSTEM FOR REPLACING BATTERY AND METHOD THEREOF

(71) Applicant: AmTRAN Technology Co., Ltd., New Taipei (TW)

(72) Inventors: Li-Chun Yang, New Taipei (TW); Ming-Han Chang, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 533 days.

(21) Appl. No.: 16/601,572

(22) Filed: Oct. 14, 2019

(65) Prior Publication Data

US 2020/0152939 A1 May 14, 2020

(30) Foreign Application Priority Data

Nov. 8, 2018 (TW) ................................ 107139718

(51) Int. Cl.
*H01M 50/20* (2021.01)
*B64C 39/02* (2006.01)
(Continued)

(52) U.S. Cl.
CPC ............ *H01M 50/20* (2021.01); *B60L 50/64* (2019.02); *B60L 53/80* (2019.02); *B64C 39/024* (2013.01);
(Continued)

(58) Field of Classification Search
CPC ..... B60L 53/80; B60L 2200/10; B64D 27/24; B64C 2201/042; H01M 2220/20
(Continued)

(56) References Cited

U.S. PATENT DOCUMENTS 10,093,418 B2 * 10/2018 Lim ...................... B64D 47/08
11,332,033 B2 * 5/2022 Wang .................... B64C 39/024
(Continued)

FOREIGN PATENT DOCUMENTS

| CN | 105992979 A | 10/2016 |
| CN | 105059550 B | 5/2017 |

(Continued)

OTHER PUBLICATIONS

J. DeGol et al., "A passive mechanism for relocating payloads with a quadrotor," 2015 IEEE/RSJ International Conference on Intelligent Robots and Systems (IROS), 2015.

*Primary Examiner* — Christopher P Ellis
(74) *Attorney, Agent, or Firm* — CKC & Partners Co., LLC (57) ABSTRACT

A battery assembly is configured to be installed on a drone. The battery assembly includes a battery, a chassis and some of swing arms. The chassis has a space within and is configured to accommodate the battery. The swing arms are pivotally connected with the chassis respectively and are located in the space. Each of the swing arms has a hook and a bump. The hooks at least partially face to each other. The bumps at least partially face to each other. When the battery is located in the space, the bumps are compressed by the battery to make the swing arms respectively rotate relative to the chassis, such that the hooks move close to each other and the battery is buckled and fixed in the space. At least one electrical connector located on the hooks contacts a conductor located on a side of the battery.

12 Claims, 6 Drawing Sheets

(51) Int. Cl.
   *B60L 53/80* (2019.01)
   *B64D 27/24* (2006.01)
   *B60L 50/64* (2019.01)

(52) U.S. Cl.
   CPC .......... *B64D 27/24* (2013.01); *B60L 2200/10* (2013.01); *B64C 2201/027* (2013.01); *B64C 2201/042* (2013.01); *B64C 2201/126* (2013.01); *B64C 2201/128* (2013.01); *B64C 2201/146* (2013.01); *H01M 2220/20* (2013.01)

(58) Field of Classification Search
   USPC .......................................................... 244/50
   See application file for complete search history.

(56) References Cited

U.S. PATENT DOCUMENTS

| | | | | |
|---|---|---|---|---|
| 11,332,264 | B2* | 5/2022 | Ratajczak | B64D 1/12 |
| 2014/0319272 | A1* | 10/2014 | Casado | B60L 50/52 |
| | | | | 244/110 E |
| 2017/0001721 | A1* | 1/2017 | Saika | B64C 39/024 |
| 2017/0174091 | A1* | 6/2017 | Miller | B60L 53/305 |
| 2018/0029845 | A1 | 2/2018 | Wrycza et al. | |
| 2018/0208070 | A1* | 7/2018 | Sanchez | B64C 39/024 |
| 2018/0312069 | A1* | 11/2018 | McClymond | B60L 53/67 |
| 2019/0315235 | A1* | 10/2019 | Kung | B64C 39/024 |
| 2021/0309388 | A1* | 10/2021 | Ratajczak | B64D 1/22 |
| 2021/0380019 | A1* | 12/2021 | Livingston | B60L 53/30 |
| 2021/0408632 | A1* | 12/2021 | Cheng | B60K 1/04 |
| 2022/0127014 | A1* | 4/2022 | Cowden | B64C 39/024 |

FOREIGN PATENT DOCUMENTS

| | | | | |
|---|---|---|---|---|
| CN | 108528745 | A | | 9/2018 |
| CN | 108790870 | A * | 11/2018 | |
| CN | 111267790 | A * | 6/2020 | B60L 53/80 |
| CN | 111267791 | A * | 6/2020 | B60L 53/80 |
| CN | 111301187 | A * | 6/2020 | B60L 53/12 |
| CN | 112278276 | A * | 1/2021 | |
| CN | 113511336 | A * | 10/2021 | |
| DE | 102013004881 | A1 * | 9/2014 | B60L 11/1816 |
| KR | 20200012082 | A * | 5/2020 | |
| KR | 20210123585 | A * | 10/2021 | |
| WO | WO-2017119803 | A1 * | 7/2017 | B64C 27/08 |
| WO | WO-2019018679 | A1 * | 1/2019 | B60K 1/04 |
| WO | WO-2019028071 | A * | 2/2019 | B64C 1/061 |
| WO | WO-2019069057 | A1 * | 4/2019 | B60L 53/35 |
| WO | WO-2019186118 | A1 * | 10/2019 | B60L 50/50 |

* cited by examiner

BATTERY ASSEMBLY, SYSTEM FOR REPLACING BATTERY AND METHOD THEREOF

RELATED APPLICATIONS

This application claims priority to Taiwanese Application Serial Number 107139718, filed Nov. 8, 2018, which is herein incorporated by reference.

BACKGROUND

Technical Field

The present disclosure relates to battery assemblies, systems for and method of replacing battery. More particularly, the present disclose relates to battery assemblies, systems for and method of replacing battery utilized on drones.

Description of Related Art

With the advancement of the technology today, the application of drones becomes more and more extensive. Through the remote control by users, the drones can fly around in the air easily and simply complete many works at height, which provides much convenience to the users.

However, apart from continuous improvements of performance and appearance in the development trends of drones, manual replacement of battery is still required for most of the drones after the drone is landed. Thus, to quickly land the drones on the base during operations and to replace the batteries within the drones automatically in order to increase the efficiency of operation is undoubtedly an important development direction of the drone industry.

SUMMARY

A technical aspect of the present disclosure is to provide a battery assembly, which can be installed on a drone and allow its battery within to be installed and uninstalled easily.

According to an embodiment of the present disclosure, a battery assembly is configured to be installed on a drone. The battery assembly includes a battery, a chassis and a plurality of swing arms. The chassis has a space and is configured to accommodate the battery. The swing arms are pivotally connected with the chassis respectively and are at least partially located in the space. Each of the swing arms has a hook and a bump. The hooks at least partially face to each other. The bumps at least partially face to each other. When the battery is located in the space, the bumps are compressed by the battery to make the swing arms respectively rotate relative to the chassis, such that the hooks move close to each other and the battery is buckled and fixed in the space. At least one electrical connector located on the hooks contacts a conductor located on a side of the battery.

In one or more embodiments of the present disclosure, the battery assembly further includes a plurality of elastic elements. The elastic elements are respectively connected with the chassis and the corresponding swing arm.

In one or more embodiments of the present disclosure, a quantity of the swing arms is an odd number.

In one or more embodiments of the present disclosure, the battery is in a shape of a cylinder.

According to an embodiment of the present disclosure, a system for replacing battery of a drone is provided. The drone has a space and a plurality of hooks. The space is configured to accommodate a battery. The hooks at least partially cover an opening, so as to buckle and fix the battery in the space. The system for replacing battery includes a device for replacing battery. The device for replacing battery includes a base, a first tray and a moving mechanism. The base has a guiding hole. The guiding hole is configured to allow the drone to at least partially pass through. The first tray has a first bump. The first bump faces to the guiding hole. The moving mechanism is configured to move the first tray towards or away from the guiding hole. When the first tray moves towards the guiding hole, the first bump moves to the opening so as to push the hooks away from each other, in order to allow the battery to follow the first tray to pass through the opening and leave from the space.

In one or more embodiments of the present disclosure, the drone has a first buckling portion. The first buckling portion is at least partially disposed around the opening. The base has a second buckling portion. The second buckling portion is at least partially disposed around the guiding hole. The first buckling portion is configured to mutually buckle with the second buckling portion.

In one or more embodiments of the present disclosure, the base has a curved surface. The curved surface is around the guiding hole and away from the first tray. The curved surface is configured to guide the drone to enter into the guiding hole.

In one or more embodiments of the present disclosure, the device for replacing battery further includes a second tray. The second tray has a second bump and a third bump. The third bump is around and away from the second bump. The second bump is configured to support the battery. The third bump is configured to abut against the first buckling portion, so as to detach the first buckling portion from the second buckling portion.

In one or more embodiments of the present disclosure, the device for replacing battery further includes a rotating device. The rotating device has a first supporting portion and a second supporting portion. The first supporting portion and the second supporting portion are disposed oppositely about an axis. The first supporting portion is configured to support the first tray. The second supporting portion is configured to support the second tray.

According to an embodiment of the present disclosure, a battery assembly is configured to be installed on a drone. The battery assembly includes a battery, a chassis and a plurality of swing arms. The chassis has a space and is configured to accommodate the battery. The swing arms are pivotally connected with the chassis respectively and are at least partially located in the space. Each of the swing arms has a hook and a bump. The hooks at least partially face to each other. The bumps at least partially face to each other. When the battery is located in the space, the bumps are compressed by the battery to make the swing arms respectively rotate relative to the chassis, such that the hooks move close to each other and the battery is buckled and fixed in the space. At least one electrical connector located within the chassis between the hooks contacts a conductor located on a side of the battery.

According to an embodiment of the present disclosure, a method of replacing battery includes controlling a drone to fly to a base, the drone having a first battery buckled within, the drone being controlled to at least partially pass through a guiding hole along a first direction and to be buckled at the base; moving a first tray of the base towards the guiding hole along a second direction to abut against the drone, so as to release the buckling of the drone to the first battery, the second direction being opposite to the first direction; supporting the first battery on the first tray; and moving the first tray and the first battery away from the drone.

In one or more embodiments of the present disclosure, the method further includes utilizing alternatively the second tray and the first tray; placing a second battery on the second tray; and moving the second tray to the guiding hole along the second direction, so as to buckle the second battery on the drone and to detach the drone from the base.

When compared with the prior art, the above-mentioned embodiments of the present disclosure have at least the following advantages:

(1) During the operations of replacing battery of the drone, the battery assembly of the drone at least partially passes through the guiding hole of the base and is buckled to the base, and the moving mechanism within the base moves the first tray towards the guiding hole of the base along the second direction, such that the first bump of the first tray is moved to the opening of the chassis within the drone, and compresses or pushes the hooks of the swing arms, which makes the hooks are pushed and moved away from each other. Thus, the used battery in the drone is released automatically from the hooks of the swing arms, which makes the used battery drop and be supported on the first tray. Afterwards, the used battery moves with the first tray under the driving of the moving mechanism and passes through the opening of the chassis within the drone while leaving from the internal space of the drone. As the operations mentioned above, the system for replacing battery automatically removes the battery from the drone in a simple and easy manner, which does not require manual operation from the user directly throughout the process. Thus, the present disclosure provides the system and method for removing the used battery from the drone, which is convenient to the user.

(2) During the operations of installing charged battery, the bumps of the swing arms are compressed by the charged battery after the charged battery enters into the internal space of the chassis within the drone. Thus, the swing arms respectively rotate relative to the chassis within the drone, and the hooks of the swing arms move close to each other which eventually buckle and fix the charged battery in the internal space of the chassis within the drone. In addition, the third bump of the second tray abuts against the first buckling portions of the chassis within the drone, such that the first buckling portions are released from the second buckling portion of the base. Thus, the drone is also free to take off from the base when the charged battery is installed. In this way, the operations of installing the charged battery within the drone and releasing the drone from the base are automatically and simultaneously performed, which do not require direct manual operation throughout the process. Thus, the present disclosure provides the system and method for installing charged battery within the drone, which is convenient to the user.

(3) During the operations of replacing battery, the used battery released from the chassis within the drone is supported by the first tray, which is moved to a position close to the guiding hole of the base, and the moving mechanism moves the used battery with the first tray from the guiding hole of the base and the drone chassis to the first supporting portion within the base. Afterwards, the first supporting portion supports the first tray and the used battery and the rotating device at least partially rotates about the vertical axis in order to change the positions of the first supporting portion and the second supporting portion simultaneously. The second tray supporting the charged battery is moved to the position matching with the guiding hole of the base and the opening of the chassis within the drone by the rotating device, so that the moving mechanism is allowed to move the second tray towards the guiding hole of the base, and the charged battery supported on the second tray is thus moved into the space of the chassis within the drone. In this way, the process of replacement of the battery can be carried out in an automatic manner.

BRIEF DESCRIPTION OF THE DRAWINGS

The disclosure can be more fully understood by reading the following detailed description of the embodiments, with reference made to the accompanying drawings as follows.

DETAILED DESCRIPTION

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
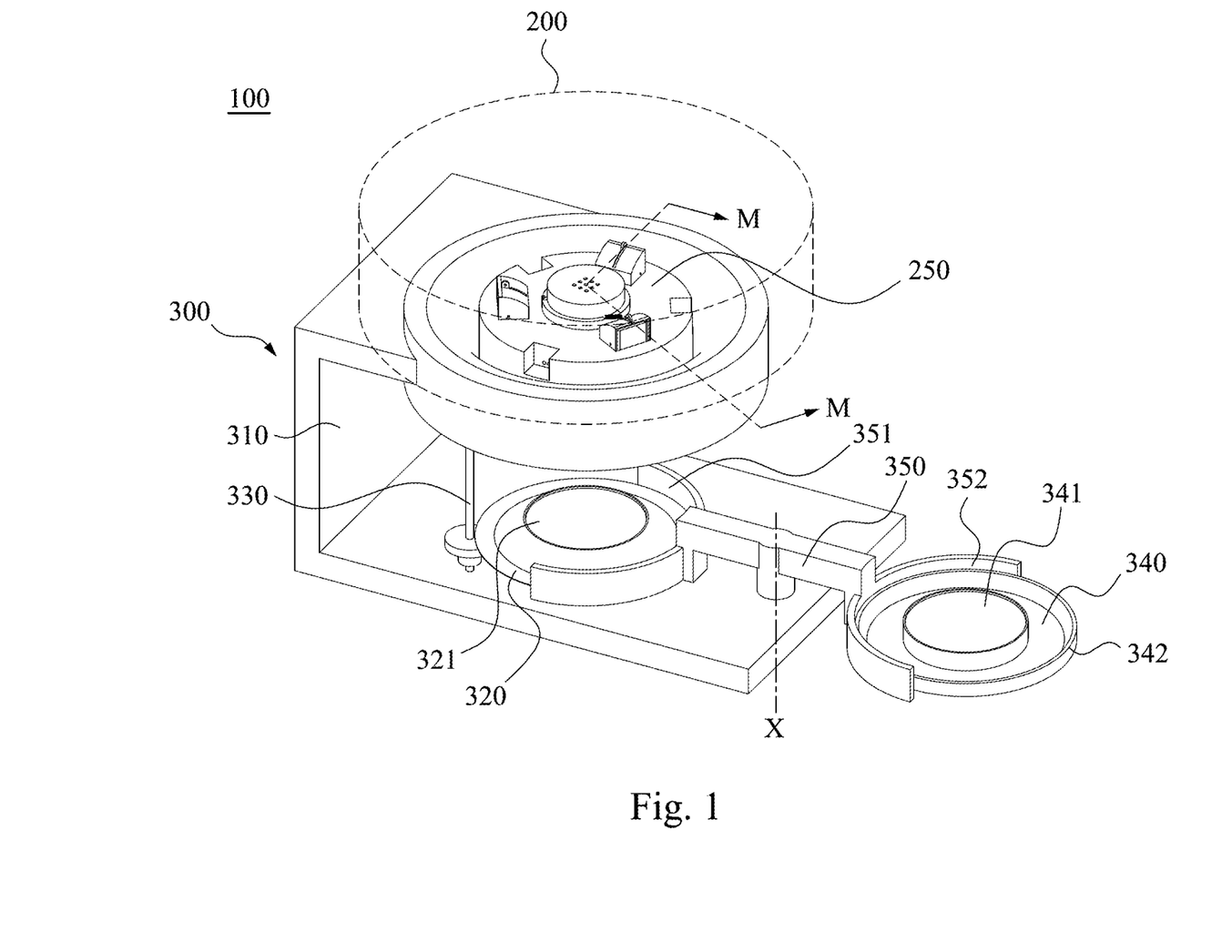
FIG. 1 is a schematic view of a system for replacing battery of a drone according to an embodiment of the present disclosure.

Reference is made to FIG. 1. FIG. 1 is a schematic view of a system for replacing battery 100 of a drone according to an embodiment of the present disclosure. In some embodiments of the present disclosure, as shown in FIG. 1, a system for replacing battery 100 includes a drone 200 and a device for replacing battery 300 of the drone 200. The drone 200 is remotely controlled by a user such that the drone 200 is able to fly in the air. The device for replacing battery 300 provides the function of installing battery into the drone 200 and removing battery from the drone 200. Please be noted that, for the sake of clear and concise figures, the upper part of the drone 200 is only illustrated by hidden lines in FIG. 1, but not illustrated in other figures. In addition, the drone 200 has a battery assembly 250 within, and the battery assembly 250 is substantially installed at the lower part of the drone 200.

Figure 2:
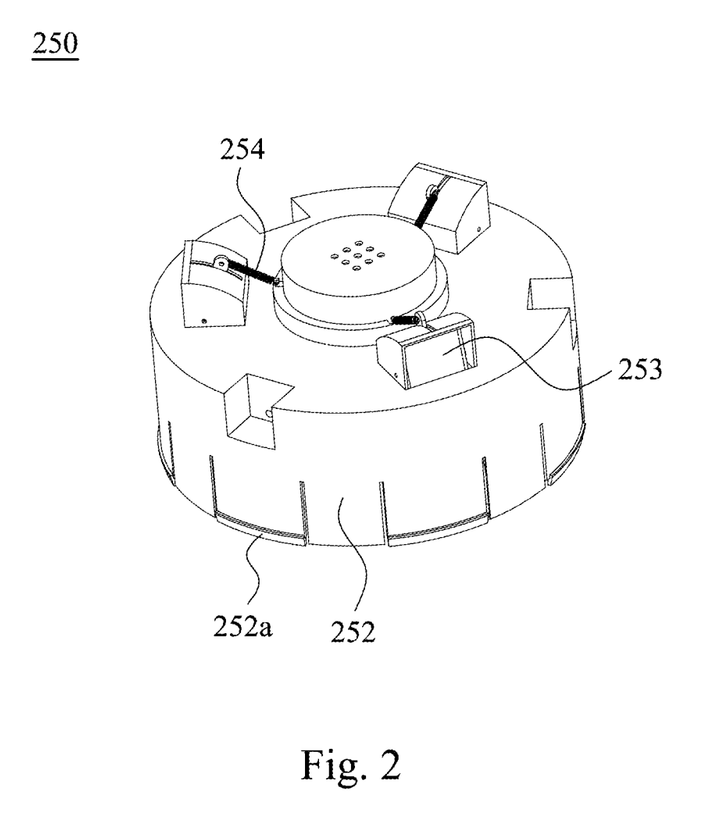
FIG. 2 is a schematic view of the battery assembly of FIG. 1.
Figure 3:
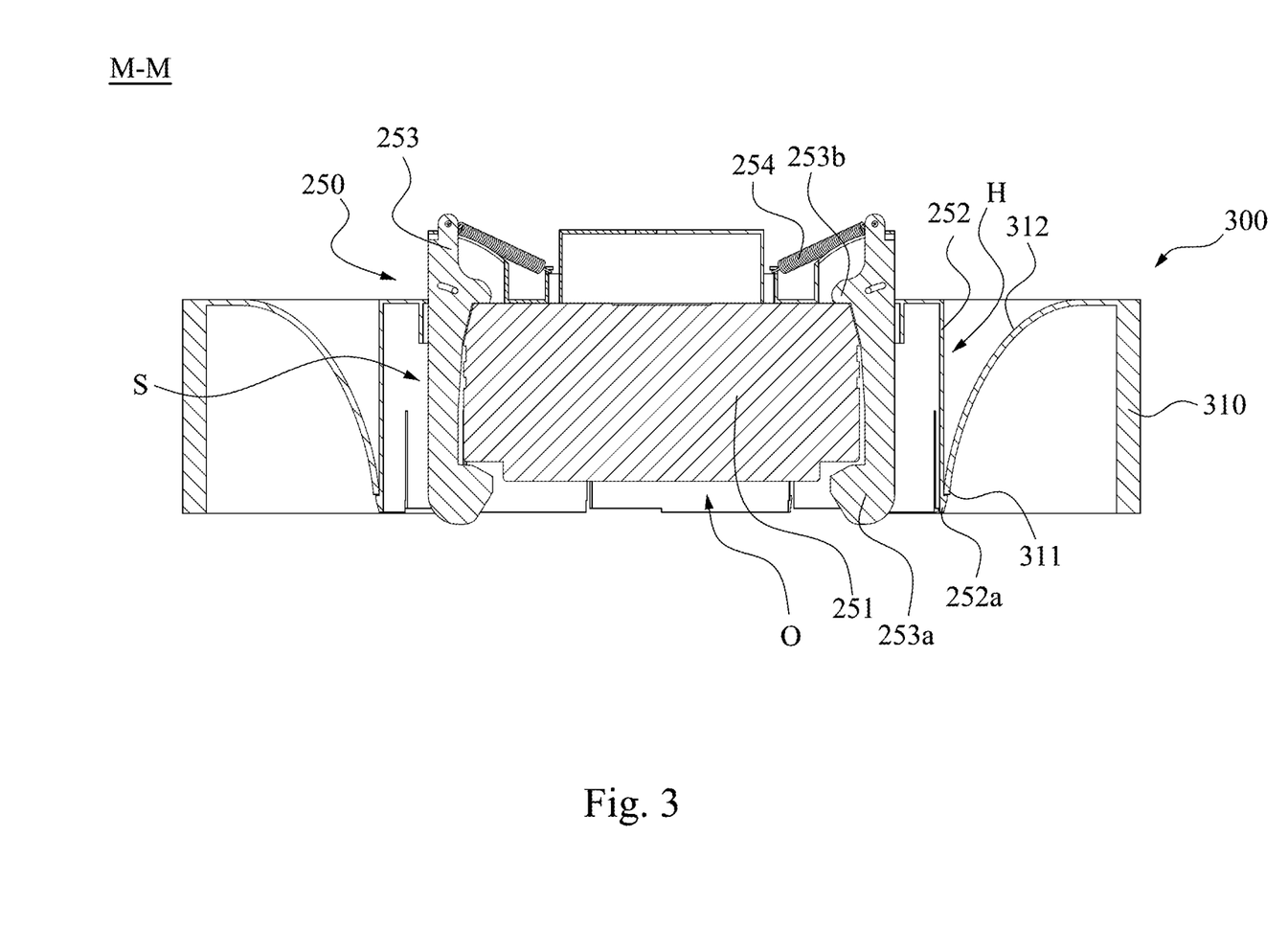
FIG. 3 is a sectional view along the section line M-M of FIG. 1.

Please refer to FIGS. 2-3. FIG. 2 is a schematic view of the battery assembly 250 of FIG. 1. FIG. 3 is a sectional view along the section line M-M of FIG. 1. In some embodiments of the present disclosure, the battery assembly 250 includes a battery 251, a chassis 252 and a plurality of swing arms 253 as shown in FIGS. 2-3. The chassis 252 has a space S within and an opening O connecting to the space S. The space S is configured to accommodate the battery 251, and the opening O exposes the battery 251 accommodated in the space S. The swing arms 253 are pivotally connected with the chassis 252 respectively, and the swing arms 253 are at least partially located in the space S of the chassis 252. Each of the swing arms 253 has a hook 253a and a bump 253b. The bumps 253b at least partially face to each other, and the hooks 253a also at least partially face to each other. The hooks 253a at least partially cover the opening O, so as to buckle and fix the battery 251 in the space S.

Specifically, when the battery 251 is located in the space S of the chassis 252, as shown in FIG. 3, the bumps 253b of the swing arms 253 are compressed by the battery 251 which makes the swing arms 253 respectively rotate relative to the chassis 252, so the hooks 253a of the swing arms 253 will move close to each other and further buckle and fix the battery 251 in the space S of the chassis 252. In addition, in the embodiments of the present disclosure, the battery assembly 250 further includes a plurality of elastic elements 254. The elastic elements 254 are connected with the corresponding swing arm 253 respectively and the chassis 252. In this way, the rotations of the swing arms 253 relative to the chassis 252 are elastic.

In some embodiments of the present disclosure, the battery 251 is a battery module having a plurality of battery cells within. For example, the battery 251 has a cylinder in shape with a diameter of about 20 cm and about 50 to 60 number of 18650 lithium ion battery cells can be accommodated within the battery 251. In this way, the weight of the battery assembly 250 can be limited to about 4 kg. In some embodiments of the present disclosure, the appearance of the battery 251 includes a cylinder portion and three electric connection points are disposed on the battery 251. One of the electric connection points is disposed on a terminal surface, such as on the top surface, of the cylinder, and the other two electric connection points are belts disposed on the side around the cylinder. Thus, when the battery 251 is buckled and fixed within the battery assembly 250, the three electric connection points are guaranteed to electrically connect to the internal circuits within the drone 200 no matter how the drone 200 is rotated. In some embodiments of the present disclosure, the electric connection point disposed on the terminal surface is the anode. The two electric connection points around the cylinder are respectively the cathode and a detection pin. However, the configuration of the electric connection points on the battery 251 can be interchanged. Other designs including the electric connection points disposed on the battery with the shape of cylinder can also be adopted in the battery assembly 250, which will not affect the performance of the present disclosure.

In some embodiments of the present disclosure, the quantity of the swing arms 253 is an odd number, such as 3, 5 or more. In practical applications, the battery 251 can be more securely buckled and fixed in the space S of the chassis 252 by the swing arms 253. In some embodiments of the present disclosure, the quantity of the swing arms 253 is 3 as shown in FIGS. 1-2. However, the present disclosure is not limited to the embodiments. In addition, the aforementioned battery 251 is in a shape of cylinder, so that the corresponding electrical connectors can be disposed around the outer surface of the cylinder, and the connectors disposed on the swing arms 253 are able to contact the side surface of the battery 251. In this way, the installation and the electrical connection of the battery 251 and the chassis 252 are not restricted or affected by the rotational direction, which provides the fool-proof structure of the battery assembly 250.

Figure 4:
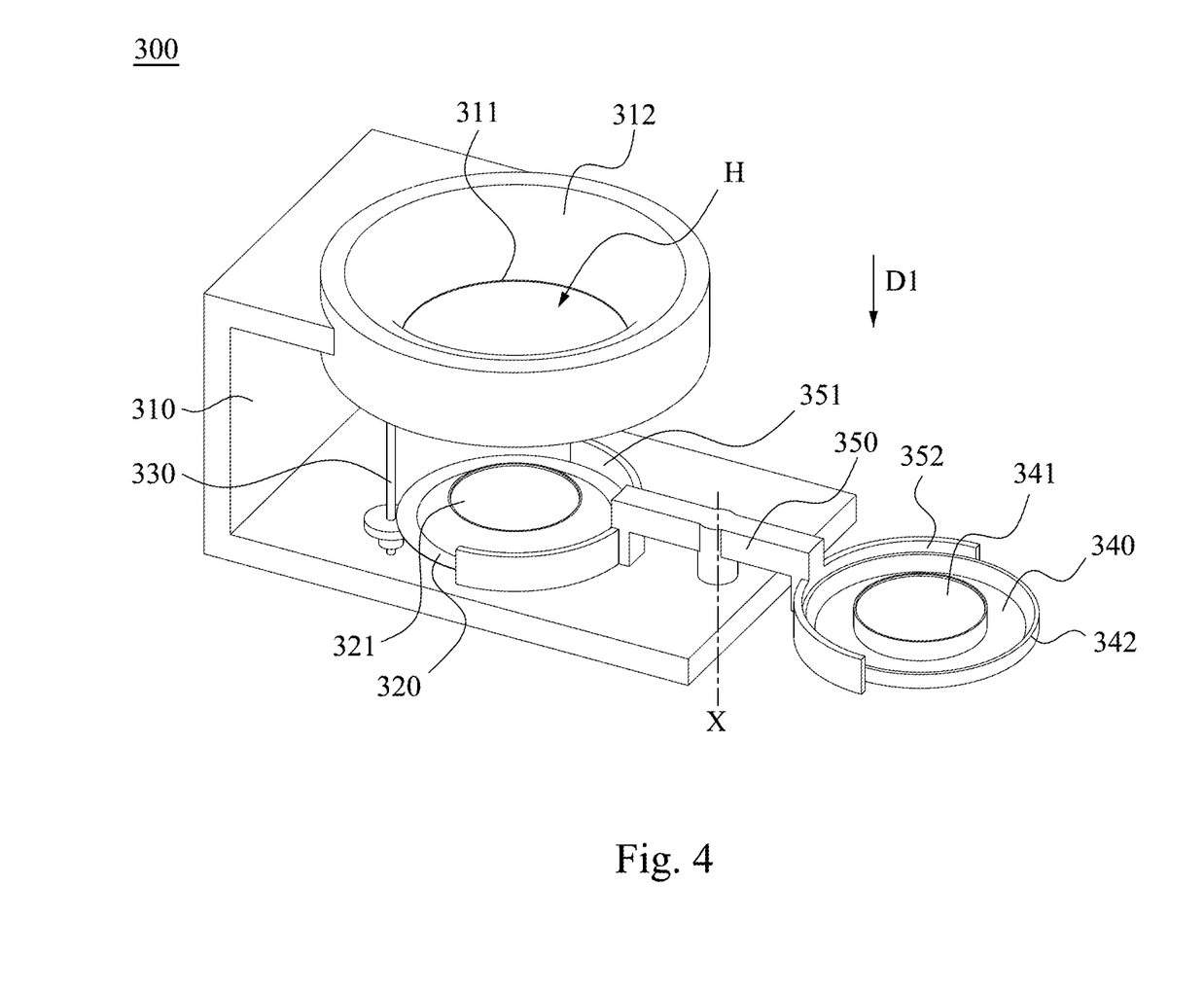
FIG. 4 is a schematic view of the device for replacing the battery of FIG. 1.

Please refer to FIG. 4. FIG. 4 is a schematic view of the device for replacing the battery 251 of FIG. 1. In some embodiments of the present disclosure, the device for replacing the battery 300, as shown in FIG. 4, includes a base 310, a first tray 320 and a moving mechanism 330. The base 310 has a guiding hole H. The guiding hole H is configured to allow the drone 200 to at least partially pass through as shown in FIG. 1. Specifically, when the battery 251 of the drone 200 has to be replaced, the user can control the drone 200 remotely and make the drone 200 land on the base 310, such that the battery assembly 250 located at the lower part of the drone 200 at least partially passes through the guiding hole H of the base 310 along the first direction D1 and the drone 200 is buckled to the base 310. As shown in FIG. 4, the first direction D1 is the direction pointing downwards in simple words.

Moreover, in order to allow the battery assembly 250 of the drone 200 to pass through the guiding hole H of the base 310 more easily, the base 310 in some of the embodiments has a curved surface 312. The curved surface 312 is around the guiding hole H and away from the first tray 320. When the battery assembly 250 of the drone 200 passes through the guiding hole H of the base 310, the curved surface 312 guides the battery assembly 250 of the drone 200 to enter into the guiding hole H. In an embodiment of the present disclosure, the landing procedure of the drone 200 only requires the battery assembly 250 of the drone 200 to be guided to enter into the guiding hole H during landing of the drone 200. No matter to which direction the drone 200 is facing during landing of the drone 200, once the battery assembly 250 enters into the guiding hole H, the device for replacing battery 300 is able to carry out the operation of replacing the battery 251 of the drone. In other words, the system for replacing battery 100 does not require any other parts of the drone 200 to be fixed at any specific position, and does not require the drone 200 to face to any specific direction during landing. Furthermore, it does not require the drone 200 to be fixed at any specific angle to a landing platform during landing. As a result, in some embodiments of the present disclosure, the drone 200 only has to locate the location of the guiding hole H during landing. It is not required to obtain the positioning information of multiple specific landing locations on the landing platform as the prior references. Thus, the problems or defects in the prior references, which require the drone to land multiple parts on the specific landing positions of the base, can be avoided, such as the requirement of high accuracy of positioning information for locating the specific landing positions of the base instantly during landing, landing failures caused by inaccurate positioning, and the time spent on aborted landing and adjusting landing directions and positions of the drone for another landing attempt.

Specifically, the chassis 252 has a first buckling portion 252a as shown in FIGS. 2-3. The first buckling portion 252a is at least partially disposed around the opening O of the chassis 252. Correspondingly, the base 310 has a second buckling portion 311 as shown in FIGS. 3-4. The second buckling portion 311 is at least partially disposed around the guiding hole H. In some embodiments of the present disclosure, when the battery assembly 250 of the drone 200 at least partially passes through the guiding hole H of the base 310 along the first direction D1, the first buckling portion 252a of the drone 200 mutually buckles with the second buckling portion 311 of the base 310, such that the drone 200 is fixed on the base 310. The mutual buckling structure of the first buckling portion 252a and the second buckling portion 311 is illustrated in the FIG. 3.

In addition, the first tray 320 has a first bump 321 as shown in FIG. 1 and FIG. 4. The first bump 321 faces to the guiding hole H of the base 310. The moving mechanism 330 is configured to raise the first tray 320 or the second tray 340 to the guiding hole H of the base 310 and lower the first tray 320 or the second tray 340 away from the guiding hole H. In other words, the moving mechanism 330 is able to move the first tray 320 towards or away from the guiding hole H of the base 310.

Figure 5:
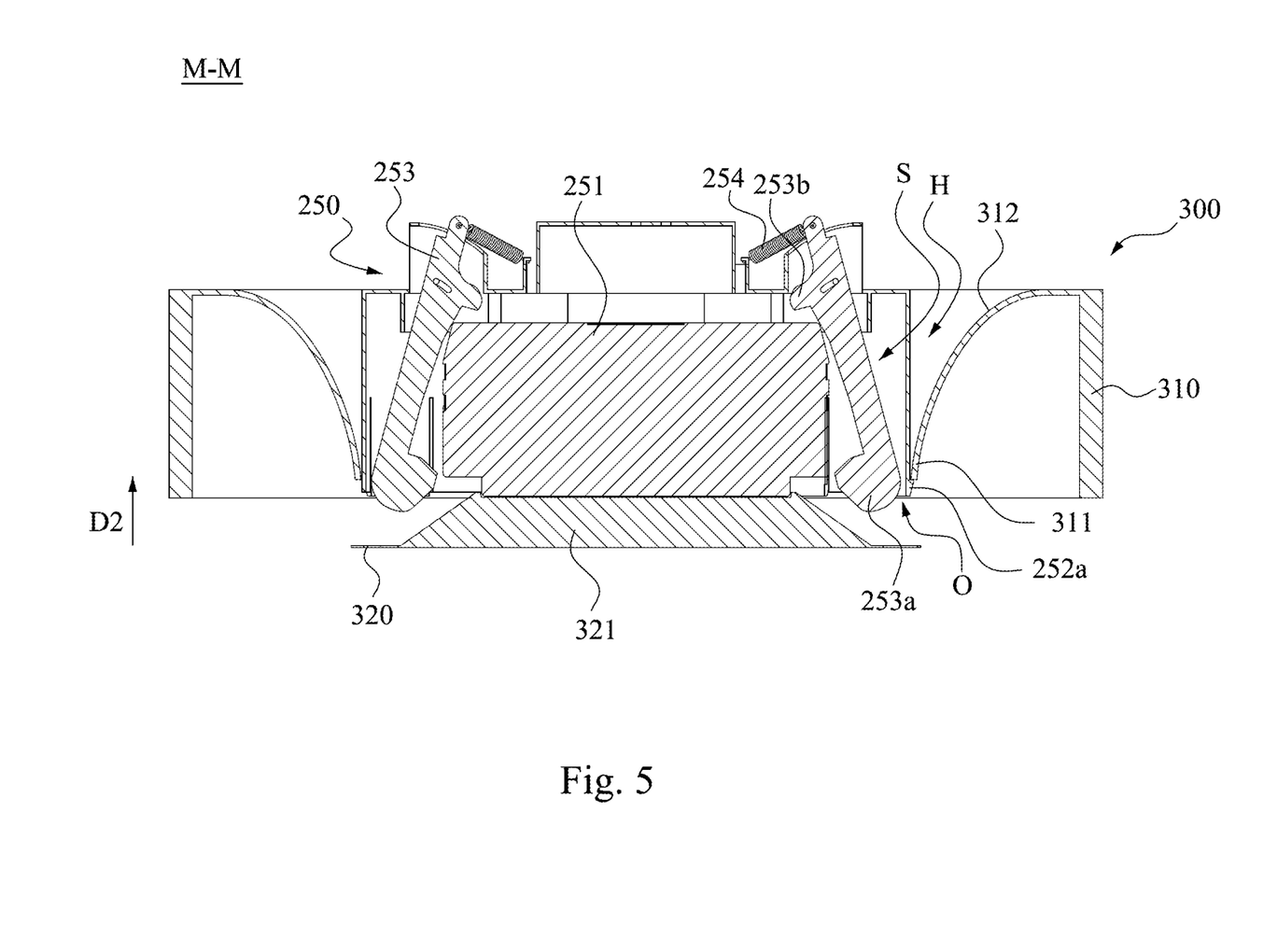
FIG. 5 is a sectional view along a section line M-M of FIG. 1, when the first tray supports the battery.

Please refer to FIG. 5, which is a sectional view along a section line M-M of FIG. 1 when the first tray 320 supports the battery 251. Specifically, the moving mechanism 330 moves the first tray 320 towards the guiding hole H of the base 310 along a second direction D2, which is the reverse of the first direction D1, when the battery assembly 250 of the drone 200 at least partially passes through the guiding hole H of the base 310 and is buckled to the base 310. The first bump 321 of the first tray 320 moves to the opening O of the chassis 252 and compresses or pushes the hooks 253a of the swing arms 253, such that the hooks 253a are pushed and move away from each other. Thus, the hooks 253a are released and no longer buckled to the battery 251. At this point, the released battery 251 is supported by the first tray 320 as shown in FIG. 5, so that the released battery 251 is able to be moved or lowered with the first tray 320 by the moving mechanism 330, which is illustrated in FIG. 1 and FIG. 4. In this way, the battery 251 will pass through the opening O of the chassis 252 and leave from the space S of the chassis 252. Thus, the device for replacing battery 300 is able to automatically remove the battery 251 from the drone 200 in a simple and easy way. No direct manual operation is required or involved throughout the removing process, which is convenient to the user of the drone 200. As shown in FIG. 5, the second direction D2 is the direction pointing upwards in simple words.

In addition, in some embodiments of the present disclosure, the device for replacing battery 300 further includes a second tray 340 as shown in FIG. 1 and FIG. 4. The second tray 340 has a second bump 341 and a third bump 342, in which the third bump 342 surrounds the second bump 341 in certain distance. The second bump 341 is configured to support the battery 251. The third bump 342 is configured to abut against the first buckling portion 252a of the chassis 252.

Specifically, after the moving mechanism 330 moves or lowers the used battery 251 with the first tray 320, the used battery 251 leaves from the space S through the opening O of the chassis 252 and a fresh or fully charged battery 251 placed on the second tray 340 will be moved and installed in the space S of the chassis 252. In some embodiments of the present disclosure, the second tray 340 with the charged battery 251 will be moved to a position under the guiding hole H of the base 310 by the rotating device 350 while the first tray 320 with the used battery 251 leaves from the position under the guiding hole H of the base 310. After the location of the second tray 340 matches with the guiding hole H of the base 310, the moving mechanism 330 moves or raises the second tray 340 up towards the guiding hole H of the base 310, so that the charged battery 251 is moved into the space S of the chassis 252.

Figure 6:
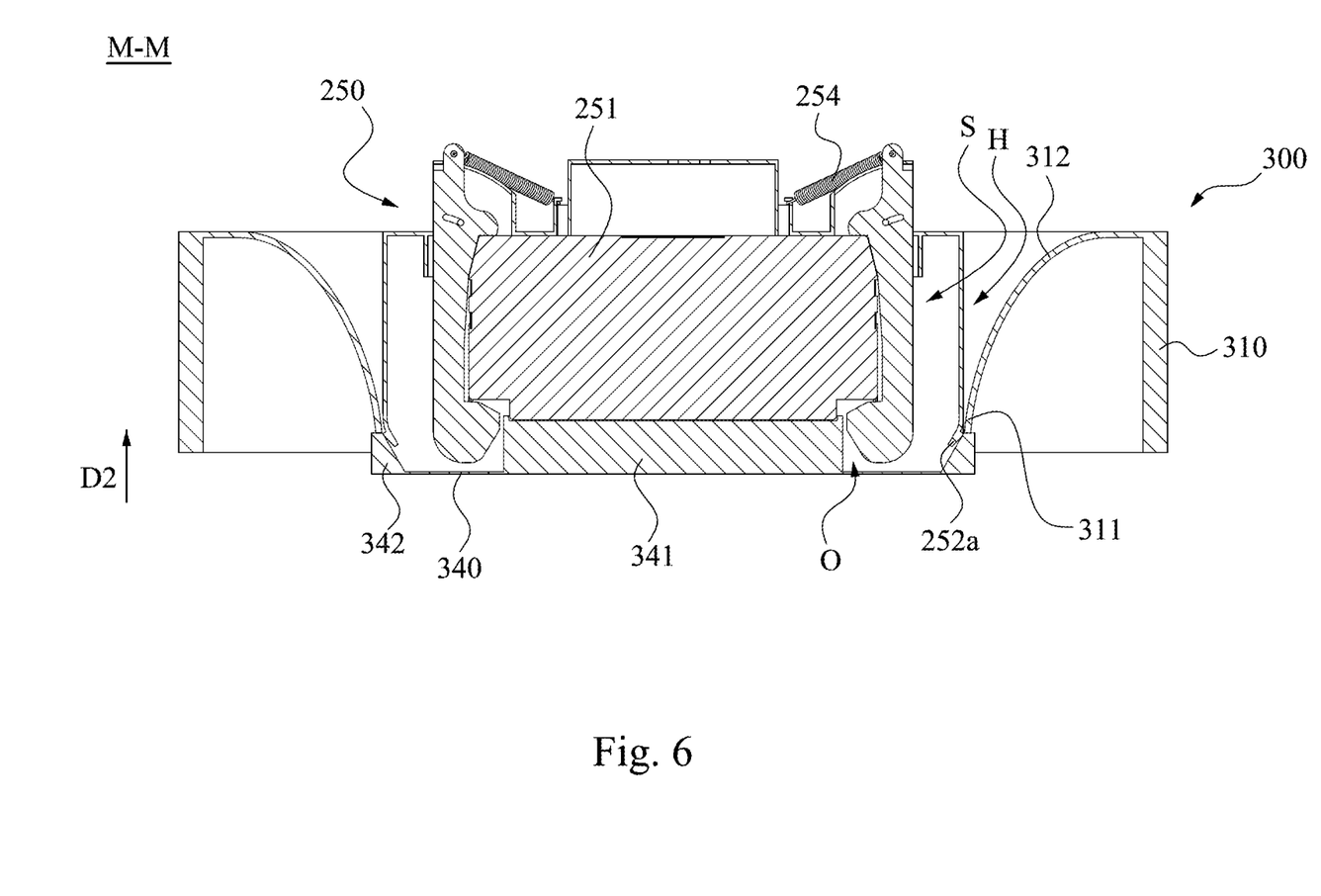
FIG. 6 is a sectional view along a section line M-M of FIG. 1, in which the second tray supports the charged battery to be installed in the battery assembly.

Please refer to FIG. 6. FIG. 6 is a sectional view along a section line M-M of FIG. 1, in which the second tray 340 supports the charged battery 251 to be installed in the battery assembly 250. In some embodiments of the present disclosure, during the operation of installing the charged battery 251 in the space S of the chassis 252 as shown in FIG. 6, the hooks 253a of the swing arms 253 are firstly pushed and move away from each other, so that the second tray 340 can move the charged battery 251 into the space S the chassis 252. After the charged battery is moved into the space S of the chassis 252, the bumps 253b of the swing arms 253 will then be pushed or compressed by the charged battery 251 such that the swing arms 253 respectively rotate relative to the chassis 252, and the hooks 253a of the swing arms 253 move close to each other in order to buckle and fix the charged battery 251 in the space S of the chassis 252. In an embodiment of the present disclosure, when the charged battery 251 is buckled and fixed within the space S of the chassis 252, the electric connection points at the top of the battery 251 contact with the electric connection points at the top of the chassis 252. The electric connection points at the side of the battery 251 contact with the electric connection points at the inner side of the chassis 252 within the space S. In some embodiments of the present disclosure, the electric connection points at the inner side of the chassis 252, which contact with the side surface of the battery 251, are disposed at points or cover a part on the circumference of the space S and are located at the space between two of the swing arms 253. In some embodiments of the present disclosure, the electric connection points in contact with the side of the battery 251 are disposed at the swing arms 253. When the charged battery 251 is buckled and fixed by the swing arms 253, the electric connection points of the battery 251 are in contact with the electric connection points disposed on the top and side of the chassis 252 within the space S, so that the battery 251 can supply power to the drone 200.

In addition, the aforementioned third bump 342 of the second tray 340 abuts against the first buckling portions 252a of the chassis 252 as shown in FIG. 6 when the second tray 340 moves close to the opening O of the chassis 252, such that the first buckling portions 252a are no longer buckled to the second buckling portion 311 of the base 310, and the drone 200 is free to detach from the base 310. In this way, the charged battery 251 can be automatically installed to the drone 200 and the drone 200 is allowed to detach from the base 310 simultaneously. No manual operation is required or involved throughout the battery replacing process, which is convenient to the user of the drone 200.

As mentioned above, the first tray 320 and the second tray 340 are utilized by turns during the operation of the system for replacing battery 100. In practical applications of some embodiments shown in FIG. 1 and FIG. 4, the device for replacing battery 300 further includes a rotating device 350 which can conveniently move the first tray 320 and the second tray 340 in order to complete the operations of the first tray 320 and the second tray 340 by turns. The rotating device 350 has a first supporting portion 351 and a second supporting portion 352. The first supporting portion 351 and the second supporting portion 352 are disposed oppositely about an axis X. The first supporting portion 351 is configured to support the first tray 320 during rotation. The second supporting portion 352 is configured to support the second tray 340 during rotation. During the operations of the system for replacing battery 100, as the rotating device 350 at least partially rotates about the axis X, the positions of the first supporting portion 351 and the second supporting portion 352 can be mutually exchanged.

Specifically, the first tray 320 supporting the used battery 251 is lowered to the first supporting portion 351 by the moving mechanism 330 and leaves the chassis 252 after the used battery 251 is released and the first tray 320 supports the used battery 251. After the first tray 320 is supported by the first supporting portion 351, the rotating device 350 at least partially rotates about the axis X, so that the second tray 340 supporting the charged battery 251 is moved to the position under the chassis 252 matching the guiding hole H of the base 310 and the opening O of the chassis 252. Afterwards, the moving mechanism 330 is allowed to move or raise the second tray 340 towards the guiding hole H of the base 310, and the charged battery 251 supported on the second tray 340 will be moved or raised into the space S of the chassis 252. In this way, the process of replacing battery 251 can be carried out in an automatic manner.

In an embodiment of the present disclosure, the first tray 320 and the second tray 340 have the same shape and structure. When the empty first tray 320 or second tray 340 moves to the opening O of the chassis 252, the structure of the empty tray will push the hooks 253a of the swing arm 253 and make the hooks 253a move away from each other, so that the used battery 251 is released from the hooks 253a such that the used battery 251 can land on the empty tray. When the tray supporting the charged battery 251 moves close to the opening O of the chassis 252, the structure or the charged battery 251 on the tray also pushes the hooks 253a of the swing arms 253 away from each other in order to allow the charged battery 251 to enter into the space S of the chassis 252. Afterwards, the tray leaves from the opening O of the chassis 252 and the elastic elements 254 drive the swing arms 253 to recover to the original positions, such that the hooks 253a buckle and fix the charged battery 251 inside the chassis 252 and the charged battery 251 electrically connects to the drone 200. In some embodiments of the present disclosure, the device for replacing battery 300 have more than two sets of trays, so that the operations of replacing batteries 251 within a plurality of drones 200 can be carried out at the same period of time, which is helpful to require the plurality of drones 200 to work simultaneously. In addition, the device for replacing battery 300 can also utilize multiple sets of trays to carry out the operations of replacing battery 251 and loading cargos or consumables at the same period of time for a single one drone 200. Since the battery assembly 250 of the drone 200 is free to enter into the guiding hole H no matter to which direction the drone 200 is facing during landing, the direction of the landed drone 200 can be adjusted by rotation, which is performed by the mechanism on or within the landing platform, even after the battery assembly 250 enters into the guiding hole H. In this way, the part of the drone 200 which carries the load or consumables can be connected and fixed with another guiding hole or other loading mechanism of the landing platform, so that the operations of loading or unloading cargo and consumables can be carried out. For example, the landing platform can perform operations of loading goods or deliveries to the drone 200 or unloading goods or deliveries from the drone 200, loading a camera and electrically connecting the camera to the drone 200, unloading the camera from the drone 200, supplying the pesticide or seeds to the agricultural drone 200, or installing or removing any function expansion modules on the drone 200, so that the drones 200 can provide optional functions during operations and continuously work on different tasks.

In conclusion, when compared with the prior art, the aforementioned embodiments of the present disclosure have at least the following advantages.

(1) During the operations of replacing battery of the drone, the battery assembly of the drone at least partially passes through the guiding hole of the base and is buckled to the base, and the moving mechanism within the base moves the first tray towards the guiding hole of the base along the second direction, such that the first bump of the first tray is moved to the opening of the chassis within the drone and compresses or pushes the hooks of the swing arms, which makes the hooks are pushed and moved away from each other. Thus, the used battery in the drone is released automatically from the hooks of the swing arms, which makes the used battery drop and be supported on the first tray. Afterwards, the used battery moves with the first tray under the driving of the moving mechanism and passes through the opening of the chassis within the drone while leaving from the internal space of the drone. As the operations mentioned above, the system for replacing battery automatically removes the battery from the drone in a simple and easy manner, which does not require manual operation from the user directly throughout the process. Thus, the present disclosure provides the system and method for removing the used battery from the drone, which is convenient to the user.

(2) During the operations of installing charged battery, the bumps of the swing arms are compressed by the charged battery after the charged battery enters into the internal space of the chassis within the drone. Thus, the swing arms respectively rotate relative to the chassis within the drone, and the hooks of the swing arms move close to each other which eventually buckle and fix the charged battery in the internal space of the chassis within the drone. In addition, the third bump of the second tray abuts against the first buckling portions of the chassis within the drone, such that the first buckling portions are released from the second buckling portion of the base. Thus, the drone is also free to take off from the base when the charged battery is installed. In this way, the operations of installing the charged battery within the drone and releasing the drone from the base are automatically and simultaneously performed, which do not require direct manual operation throughout the process. Thus, the present disclosure provides the system and method for installing charged battery within the drone, which is convenient to the user.

(3) During the operations of replacing battery, the used battery released from the chassis within the drone is supported by the first tray, which is moved to a position close to the guiding hole of the base, and the moving mechanism moves the used battery with the first tray from the guiding hole of the base and the drone chassis to the first supporting portion within the base. Afterwards, the first supporting portion supports the first tray and the used battery and the rotating device at least partially rotates about the vertical axis in order to change the positions of the first supporting portion and the second supporting portion simultaneously. The second tray supporting the charged battery is moved to the position matching with the guiding hole of the base and the opening of the chassis within the drone by the rotating device, so that the moving mechanism is allowed to move the second tray towards the guiding hole of the base, and the charged battery supported on the second tray is thus moved into the space of the chassis within the drone. In this way, the process of replacement of the battery can be carried out in an automatic manner.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A battery assembly, configured to be installed on a drone, the battery assembly comprising:
    a battery;
    a chassis having a space within and configured to accommodate the battery; and
    a plurality of swing arms pivotally connected with the chassis respectively, and at least partially located in the space, each of the swing arms having a hook and a bump, the hooks at least partially facing to each other, the bumps at least partially facing to each other,
    wherein when the battery is located in the space, the bumps are compressed by the battery to make the swing arms respectively rotate relative to the chassis, such that the hooks move close to each other and the battery is buckled and fixed in the space, and at least one electrical connector located on the hooks contacts a conductor located on a side of the battery.

2. The battery assembly of claim 1, further comprising:
    a plurality of elastic elements respectively connected with the chassis and the corresponding swing arm.

3. The battery assembly of claim 1, wherein a quantity of the swing arms is an odd number.

4. The battery assembly of claim 1, wherein the battery is in a shape of a cylinder.

5. A system for replacing battery of a drone, the drone having a space and a plurality of hooks, the space being configured to accommodate a battery, the hooks at least partially covering an opening, so as to buckle and fix the battery in the space, the system for replacing battery comprising:
    a device for replacing battery, comprising:
        a base having a guiding hole configured to allow the drone to at least partially pass through;
        a first tray having a first bump facing to the guiding hole; and
        a moving mechanism configured to move the first tray towards or away from the guiding hole,
    wherein when the first tray moves towards the guiding hole, the first bump moves to the opening so as to push the hooks away from each other, in order to allow the battery to follow the first tray to pass through the opening and leave from the space.

6. The system for replacing battery of claim 5, wherein the drone has a first buckling portion at least partially disposed around the opening, the base has a second buckling portion at least partially disposed around the guiding hole, the first buckling portion is configured to mutually buckle with the second buckling portion.

7. The system for replacing battery of claim 6, wherein the base has a curved surface being around the guiding hole and away from the first tray, the curved surface is configured to guide the drone to enter into the guiding hole.

8. The system for replacing battery of claim 6, wherein the device for replacing battery further comprises a second tray having a second bump and a third bump, the third bump is around and away from the second bump, the second bump is configured to support the battery, the third bump is configured to abut against the first buckling portion, so as to detach the first buckling portion from the second buckling portion.

9. The system for replacing battery of claim 8, wherein the device for replacing battery further comprises a rotating device having a first supporting portion and a second supporting portion, the first supporting portion and the second supporting portion are disposed oppositely about an axis, the first supporting portion is configured to support the first tray, the second supporting portion is configured to support the second tray.

10. A battery assembly, configured to be installed on a drone, the battery assembly comprising:
    a battery;
    a chassis having a space within and configured to accommodate the battery; and
    a plurality of swing arms pivotally connected with the chassis respectively, and at least partially located in the space, each of the swing arms having a hook and a bump, the hooks at least partially facing to each other, the bumps at least partially facing to each other,
    wherein when the battery is located in the space, the bumps are compressed by the battery to make the swing arms respectively rotate relative to the chassis, such that the hooks move close to each other and the battery is buckled and fixed in the space, and at least one electrical connector located within the chassis between the hooks contacts a conductor located on a side of the battery.

11. A method of replacing battery, comprises:
    controlling a drone to fly to a base, the drone having a first battery buckled within, the drone being controlled to at least partially pass through a guiding hole along a first direction and to be buckled at the base;
    moving a first tray of the base towards the guiding hole along a second direction to abut against the drone, so as to release the buckling of the drone to the first battery, the second direction being opposite to the first direction;
    supporting the first battery on the first tray; and
    moving the first tray and the first battery away from the drone.

12. The method of replacing battery of claim 11, further comprises:
    utilizing alternatively the second tray and the first tray;
    placing a second battery on the second tray; and
    moving the second tray to the guiding hole along the second direction, so as to buckle the second battery on the drone and to detach the drone from the base.

* * * * *